United States Patent
Callway

Patent Number: 6,157,365
Date of Patent: Dec. 5, 2000

[54] METHOD AND APPARATUS FOR PROCESSING VIDEO AND GRAPHICS DATA UTILIZING A HIGHER SAMPLING RATE

[75] Inventor: Edward G. Callway, Toronto, Canada

[73] Assignee: ATI Technologies, Inc., Thornhill, Canada

[21] Appl. No.: 09/047,297
[22] Filed: Mar. 24, 1998
[51] Int. Cl.[7] .............................. G09G 5/00; H04N 11/22
[52] U.S. Cl. ............................................ 345/115; 348/455
[58] Field of Search .................................... 345/302, 440, 345/113, 114, 115, 148, 154; 348/455

[56] References Cited

U.S. PATENT DOCUMENTS

| | | | |
|---|---|---|---|
| 5,168,359 | 12/1992 | Mills | 348/458 |
| 5,402,148 | 3/1995 | Post et al. | 345/132 |
| 5,406,306 | 4/1995 | Sianne et al. | 345/115 |
| 5,594,467 | 1/1997 | Marlton et al. | 345/115 |
| 5,640,332 | 6/1997 | Baker et al. | |

Primary Examiner—Mark R. Powell
Assistant Examiner—Thu Nguyen
Attorney, Agent, or Firm—Markison & Reckamp, P.C.

[57] ABSTRACT

A method and apparatus for processing video data and graphics data with minimal visual differences is accomplished by retrieving the graphics data and the video data at a first clock rate. Having retrieved the video data, it is sampled at a second clock rate to produce sampled video data. The second clock rate is greater than the first such that the video data is sampled at a higher rate than the pixel rate of the computing device. The sampled video data is then filtered by a low-pass filter to produce filtered video data. The filtered video data is then mixed, based on a control signal, with the retrieved graphics data to produce a mixed signal that is subsequently displayed.

10 Claims, 3 Drawing Sheets

METHOD AND APPARATUS FOR PROCESSING VIDEO AND GRAPHICS DATA UTILIZING A HIGHER SAMPLING RATE

TECHNICAL FIELD OF THE INVENTION

The present invention relates generally to video graphics processing and more particularly to processing video and graphics data using a higher sampling rate.

BACKGROUND OF THE INVENTION

The basic architecture of computing devices is known to include a central processing unit ("CPU"), system memory, input/output ports, an address generation unit ("AGU"), program control circuitry, interconnecting buses, audio processing circuitry and video processing circuitry. As the technology of computing device elements continues to advance, computing devices are being used in more and more commercial applications. For example, computer devices are used in video game players, personal computers, work stations, video cameras, video recorders, televisions, etc. The technological advances are also enhancing video quality, audio quality, and the speed at which the computing devices process data. The enhancements of video quality are a direct result of video graphic circuit evolution.

Video graphics circuits have evolved from providing simple text, and/or two-dimensional images to relatively complex three-dimensional images. In addition, video graphics circuit evolution allows computer displays, or monitors, to simultaneously display graphics data and video data. Typically, graphics data is generated by the central processing unit while performing particular software applications such as word processing applications, drawing applications, computer aided drafting applications, etc. A television encoder generates the video data as it receives signals via a television broadcast, cable television, satellite television, VCR player, and/or DVD player. The television encoder converts the video data into digitized video such that the video graphics circuit can process it and cause it to be displayed.

While existing technology allows video data and graphics data to simultaneously be displayed on computer monitors, there are noticeable differences between the displayed graphics data and the displayed video data The differences arise because the video signals (i.e., normally provided to a television) are analog signals, which are sampled by the video graphics processing circuitry at the pixel rate of the circuit (i.e., the rate at which the computer processes graphics data). As such, the analog signal is being sampled once per pixel. By only sampling the analog signals once per pixel, the resulting digitized video data may be sufficiently different, from pixel to pixel, to produce perceivable jagged edges of images being displayed. As such, video images, when displayed on a computer monitor, have adverse visual affects when compared to the video signals being displayed on a television.

Therefore, a need exists for a method and apparatus that allows video data to be displayed on a computer monitor with minimal adverse visual affects.

DETAILED DESCRIPTION OF A PREFERRED EMBODIMENT

DETAILED DESCRIPTION OF A PREFERRED EMBODIMENT

Generally, the present invention provides a method and apparatus for processing video and graphics data such that video data may be displayed on a computer display with minimal adverse visual affects. This may be accomplished by retrieving the graphics data and the video data at a first clock rate. Having retrieved the video data, it is sampled at a second clock rate to produce sampled video data. The second clock rate is greater than the first such that the video data is sampled at a higher rate than the pixel rate of the computing device. A low-pass filter then filters the sampled video data to produce filtered video data. The filtered video data is then mixed, based on a control signal, with the retrieved graphics data to produce a mixed signal that is subsequently displayed. With such a method and apparatus, a computer may display video data and graphics data simultaneously with minimal adverse visual affects of the video data.

Figure 1:
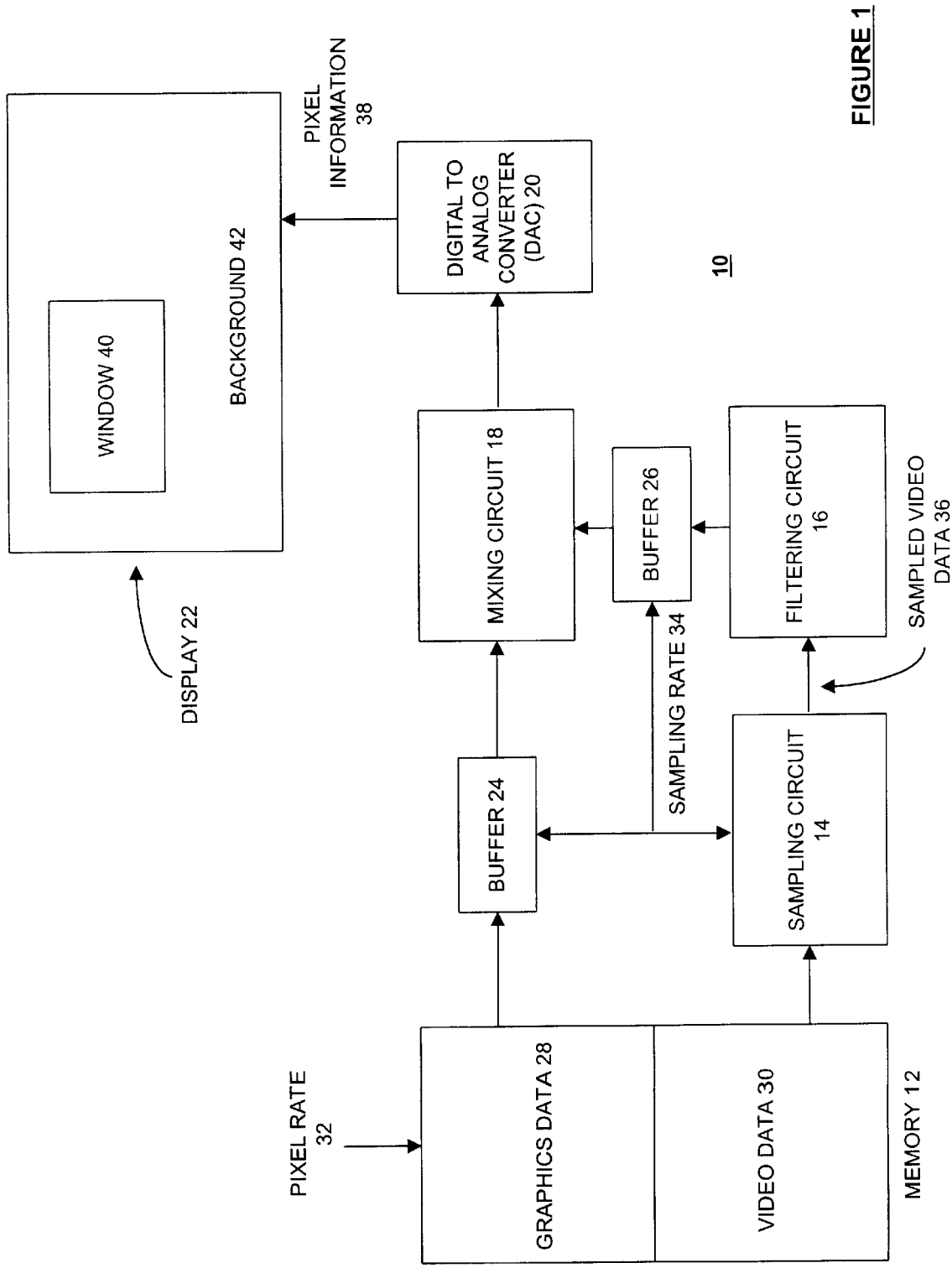
FIG. 1 illustrates a schematic block diagram of a video graphics circuit in accordance with the present invention.

The present invention can be more fully described with reference to FIGS. 1 through 5. FIG. 1 illustrates a schematic block diagram of a video graphics processing circuit 10 that includes memory 12, a sampling circuit 14, a filtering circuit 16, a mixing circuit 18, a digital to analog converter (DAC) 20, a display 22, a first buffer 24, and a second buffer 26. The memory 12 may be a frame buffer that includes read-only memory, random access memory, electronically reprogrammable memory, system memory, and/or any other device that stores digital information. The memory 12 stores graphics data 28 and/or video data 30, where the storage is dependent on what is to be displayed. Typically, the display 22 displays a background 42 and at least one window 40, where the graphics data is displayed in the background 42 and the video data is displayed in the window 40, or vice versa. As such, the video and/or graphics data is mapped into memory 12 based on the physical coordinates of the window 40 (i.e., where the window appears on the display 22).

The graphics data 28 and/or video data 30 are written into and read from the memory 12 at the pixel rate 32. If the display size of display 22 is 640×480 pixels, the pixel rate 32 is approximately 12.27 megahertz. As another example, if the display size is 1,280 pixels×960 pixels, the display rate 32 is approximately 25 megahertz.

Once a frame of graphics and/or video data 28, 30 is stored in memory 12, a memory controller (not shown) coordinates the reading of the data from memory 12 based on the memory mapping of the window and background. When the graphics data 28 is read from the memory 12, the memory controller causes it to be provided to the buffer 24 at the pixel rate 32. When the video data 30 is read from the memory 12, the memory controller causes it to be provided to the sampling circuit 14 at the pixel rate 32.

The sampling circuit 14 samples the received video data 30 at a sampling rate 34, which is greater than the pixel rate 32, to produce sampled video data 36. As is known to one of average skill in the art, when signals are sampled at a higher sampling rate, the digital representations thereof are more accurate. As such, the sampled video data 36 will be a higher resolution signal than it would have been if sampled at only the pixel rate 32. Thus, the higher resolution sampled video data 36 is more closely matched, with respect to resolution, to the graphics data 28. Note that the sampling rate 34 is synchronous and a multiple of the pixel rate 32. For example, if the pixel rate 32 is 12.27 megahertz, the sampling rate will be approximately 48 megahertz. As such, the video data is sampled several times per pixel, thereby providing several samples per pixel, which are used to reconstruct the video data with reduced jagged edges and thereby reducing the adverse visual affects.

The filtering circuit 16, which is a low-pass filter, receives the sampled video data 36 and subsequently filters out its high frequency components (i.e., those greater than the signal bandwidth). For example, the filtering circuit 16 may have a corner frequency of 4.2 megahertz. Once the signal is filtered, it is written into buffer 26 at the sampling rate 34. At this point, the contents of buffer 24 (i.e., the stored graphics data) and/or the contents buffer 26 (i.e., the filtered video data) are provided, as determined by the memory controller and/or a CRT controller (not shown), to the mixing circuit 18 at the sampling rate 34. The mixing circuit 18 processes the received data and provides the resultant to the DAC 20. The DAC 20 converts the resultant into analog signals that are subsequently displayed on display 22.

The mixing circuit 18 may process the received data in a variety of ways depending on the desired display. For example, if window 40 is opaque, the mixing circuit 18 passes the filtered video data and/or the graphics data to the DAC 20 as it receives it. Alternatively, if the window 40 is translucent, the mixing circuit blends the filtered video data with the graphics data and provides the blended data to the DAC 20. Regardless of the desired display settings, by sampling the video data at a rate greater than the pixel rate, the resolution of the video data is enhanced, thereby minimizing the visual differences between displayed video data and displayed graphics data.

Figure 2:
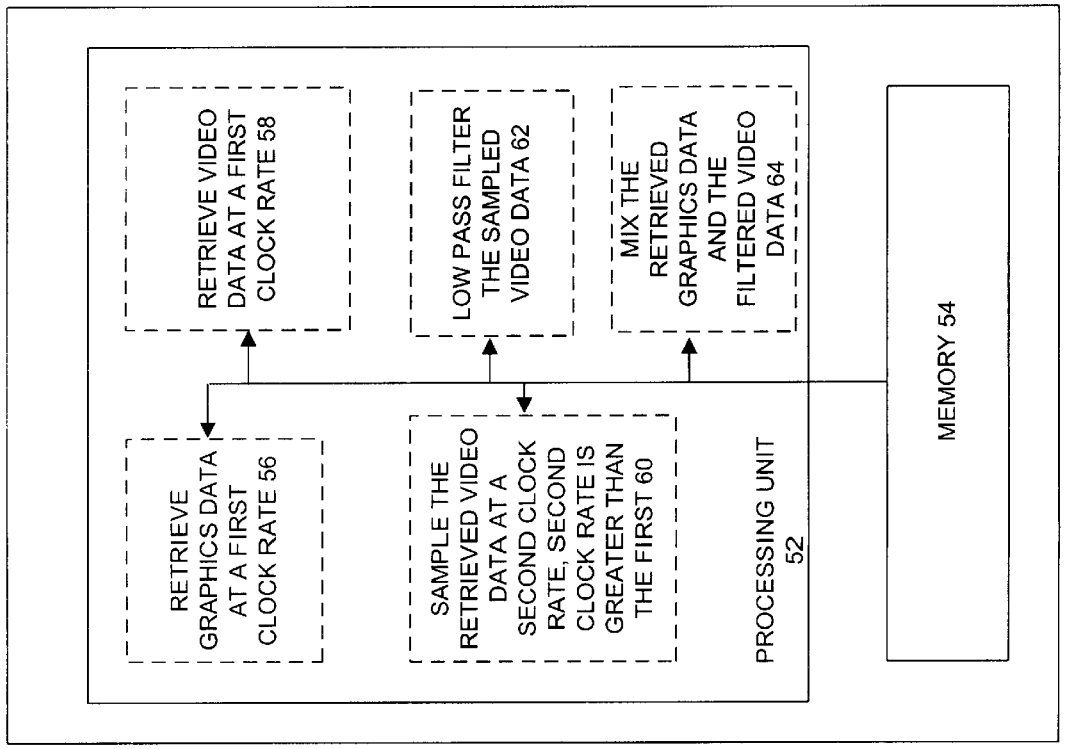
FIG. 2 illustrates a schematic block diagram of a video graphics processing circuit in accordance with the present invention.

FIG. 2 illustrates a schematic block diagram of a video processing circuit 50 that includes a processing unit 52 and memory 54. The processing unit 52 may be a microprocessor, microcontroller, digital signal processor, microcomputer, central processing unit, and/or any other device that manipulates digital information based on programming instructions. The memory 54 may be read-only memory, random access memory, floppy disk memory, hard disk memory, magnetic tape memory, DVD ROM memory, CD ROM memory, and/or any other device for storing digital information.

The memory 54 stores programming instructions that, when read by the processing unit 52, causes the processing unit 52 to function as a plurality of circuits 56–64. While reading the programming instructions the processing unit 52 functions as a circuit 56 to receive graphics data at a first clock rate. Next, the processing unit 52 functions as circuit 58 to retrieve video data at the first clock rate. Next, the processing unit functions as circuit 60 to sample the retrieved video data at a second clock rate, wherein the second clock rate is greater than the first clock rate. The processing unit 52 then functions as circuit 62 to low-pass filter the sampled video data. The processing unit 52 then functions as circuit 64 to mix the retrieved graphics data with the filtered video data. The programming instructions stored in memory 50 and the execution thereof by the processing unit 52 will be discussed in greater detail with reference to FIG. 4.

Figure 3:
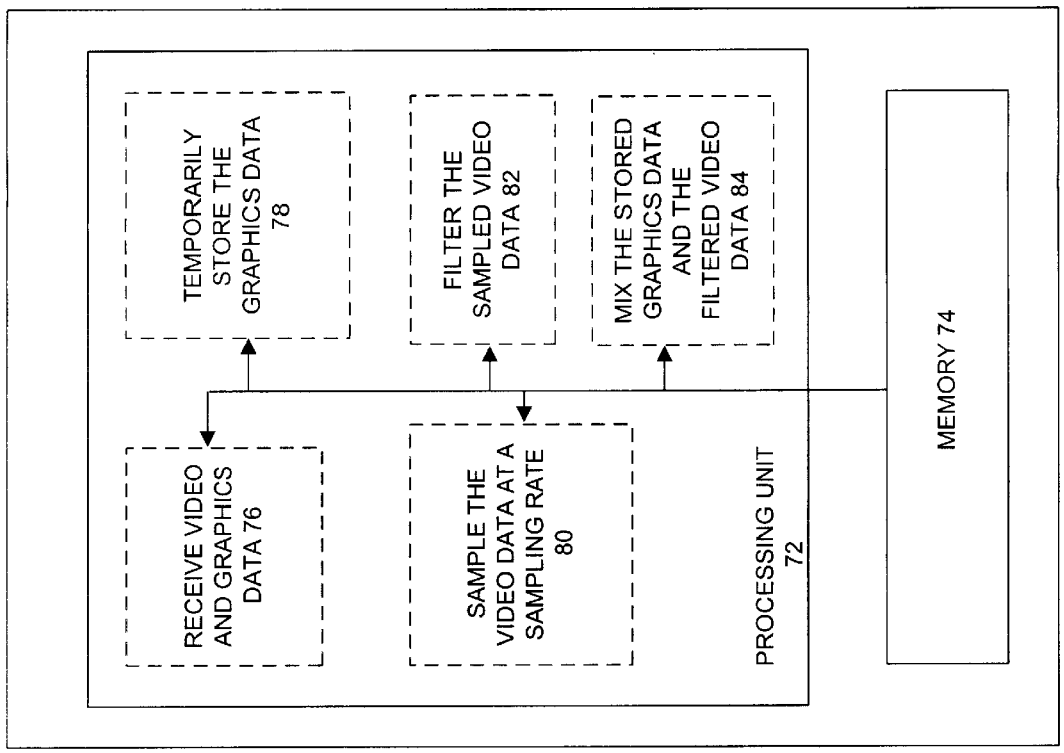
FIG. 3 illustrates a schematic block diagram of an alternate video graphics processing circuit in accordance with the present invention.

FIG. 3 illustrates a video graphics processing circuit 70 that includes a processing unit 72 and memory 74. The processing unit 72 may be a microprocessor, microcontroller, digital signal processor, microcomputer, central processing unit, and/or any other device that manipulates digital information based on programming instructions. The memory 74 may be read-only memory, random access memory, floppy disk memory, hard disk memory, magnetic tape memory, DVD ROM memory, CD ROM memory, and/or any other device for storing digital information.

The memory 74 stores programming instructions that, when read by the processing unit 72, causes the processing unit 72 to function as a plurality of circuits 76–84. While reading the programming instructions, the processing unit 72 functions as circuit 76 to receive video and graphics data. The processing unit 72 then functions as circuit 78 to temporarily store the graphics data. The processing unit 72 then functions as circuit 80 to sample the video data at a sampling rate. The processing unit 72 then functions as circuit 82 to filter the sampled video data. The processing unit 72 functions then as circuit 84 to mix the store graphics data and the filtered video data. The programming instructions read and executed by processing unit 72 will be discussed in greater detail with reference to FIG. 5.

Figure 4:
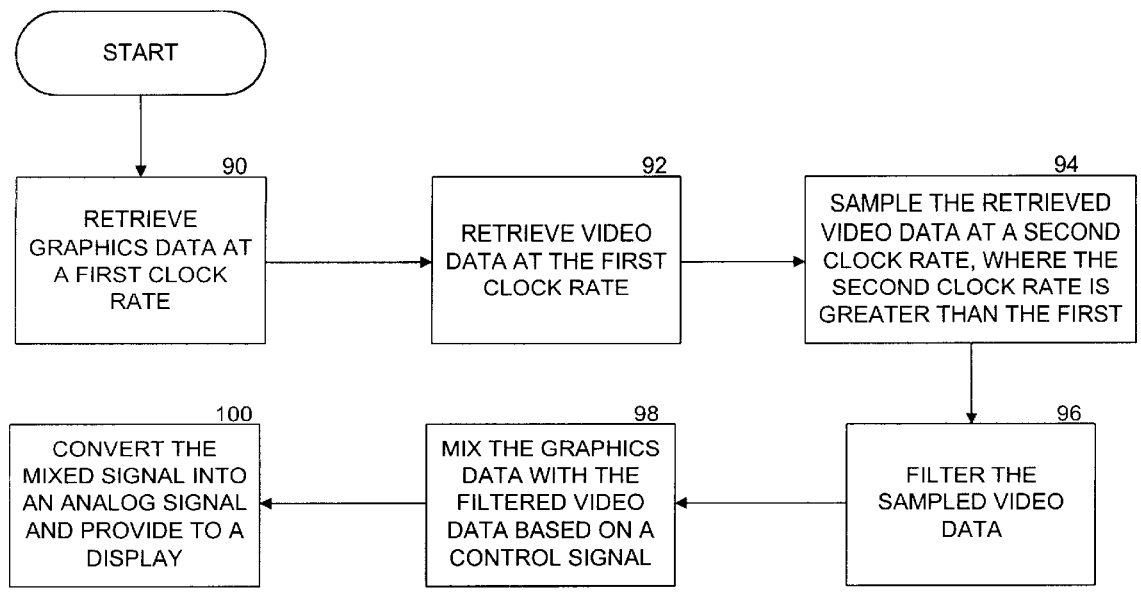
FIG. 4 illustrates a logic diagram of a method for processing video and graphic data in accordance with the present invention.

FIG. 4 illustrates a logic diagram of a method for processing video data and graphics data. The process begins at step 90 where graphics data is retrieved from a memory at the first clock rate to produce retrieved graphics data. The graphics data may be received from a DVD player wherein the graphics data is generally included in the subpicture information contained within a DVD data stream. The process then proceeds to step 92 where video data is retrieved at the first clock rate to produce retrieved video data. The video data may also be retrieved from a DVD player as video data contained within the DVD data stream. The process then proceeds to step 94 where the retrieved video data is sampled at a second clock rate to produce sampled video data. The second clock rate is greater than the first. Typically, the second clock rate will be at least twice the rate of the first clock rate. For example, if the first clock rate is 12.27 megahertz, the second clock rate will be approximately 25 megahertz. The process then proceeds to step 98 where the sample video data is filtered to produce filtered video data. The filtering is done by a low-pass filter to attenuate high-frequency components of the sampled video data.

The process then proceeds to step 98 where the retrieved graphics data is mixed with the filtered video data to produce mixed data. The mixing is done based on a control signal such that graphics data is displayed at a particular pixel location, the filtered video data is displayed at the particular pixel location, or a blended representation of the graphics and video data is displayed at the pixel location. The process then proceeds to step 100 where the mixed signal is converted into an analog signal and subsequently provided to a display, which may be an LCD display, a high definition television display, or a computer monitor.

Figure 5:
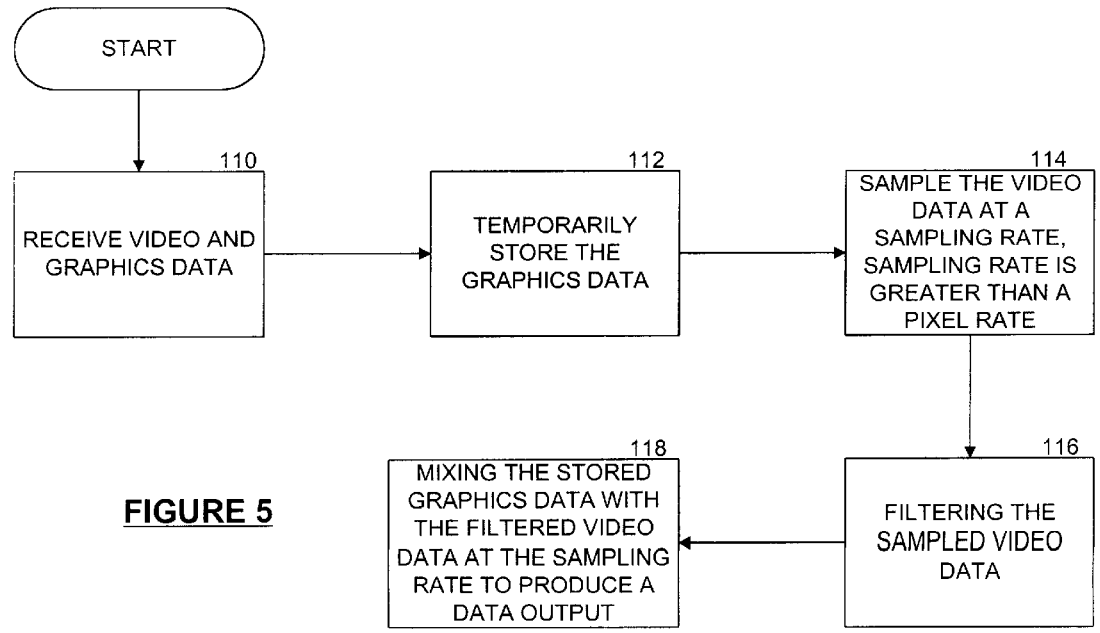
FIG. 5 illustrates a logic diagram of an alternate method for processing video and graphics data in accordance with the present invention.

FIG. 5 illustrates a logic diagram of an alternate method for processing video data and graphics data. The process begins at step 110 where video and graphics data are received. The video and graphics data may be received from a DVD player wherein the video data corresponds to video content of a DVD data stream and the graphics data corresponds to subpicture data in the DVD data stream. The process then proceeds to step 112 where the graphics data is temporarily stored. The process then proceeds to step 114 where the video data is sampled at a sampling rate. Note that the sampling rate is greater than the pixel data rate. The process then proceeds to step 116 where the sampled video data is filtered. Having filtered the video data, the process proceeds to step 118 where the stored graphics data is mixed with the filtered video data. Such mixing is done at the sampling rate to produce a data output. The data output is provided to a digital to analog converter such that the analog signal may be provided to a display.

The preceding discussion has presented a method and apparatus for processing video data and graphics data on a computer screen such that there is minimal visual difference between them. This is accomplished by processing the graphics data at the pixel rate of the computer device and oversampling the video data to produce a higher resolution signal. When displayed, the higher resolution signal reduces the adverse visual affects caused by jagged edges.

What is claimed is:

1. A method for processing video data and graphics data, the method comprises the steps of:

a) retrieving the graphics data at a first clock rate to produce retrieved graphics data;

b) retrieving the video data at the first clock rate to produce retrieved video data;

c) sampling the retrieved video data at a second clock rate to produce sampled video data, wherein the second clock rate is greater than the first clock rate;

d) filtering the sampled video data to produce filtered video data, wherein the filtering attenuates high frequency components of the sampled video data;

e) mixing, based on a control signal, the retrieved graphics data with the filtered video data to produce mixed data; and f) buffering the graphics data and retrieving the graphics data from a buffer at the second clock rate to produce the retrieved graphics data.

2. The method of claim 1 further comprises converting the mixed signal into an analog signal and providing the analog signal to a monitor.

3. The method of claim 1 further comprises establishing the second clock rate to be twice the first clock rate.

4. The method of claim 1 further comprises providing the mixed data to at least one of an LCD display, a high definition television, and a computer monitor.

5. The method of claim 1 further comprises, within step (a), retrieving the graphics data and the video data from a DVD player.

6. The method of claim 1, wherein the step of retrieving the graphics data includes retrieving the graphic data from memory, and the step of retrieving the video data includes retrieving the video data from memory.

7. A video graphics processing circuit comprises:

memory for storing video data and graphics data;

sampling circuit operably coupled to the memory, wherein the sampling circuit samples the video data at a sampling rate to produce sampled video data, wherein the sample rate is greater than a pixel rate;

filtering circuit operably coupled to the sampling circuit, wherein the filtering circuit filters the sampled video data to produce filtered video data;

mixing circuit operably coupled to receive the graphics data and the filtered video data and to produce therefrom, mixed data; and temporary memory operably coupled to the memory, wherein the graphics data is read from the memory to the temporary memory at the pixel rate and read from the temporary memory at the sampling rate.

8. The video graphics processing circuit of claim 7 further comprises a digital to analog converter operably coupled to receive the mixed data and to produce therefrom an analog signal.

9. The video graphics processing circuit comprises:

processing unit; and memory that stores programming instructions that, when read by the processing unit, causes the processing unit to (a) retrieve the graphics data at a first clock rate to produce retrieved graphics data; (b) retrieve the video data at the first clock rate to produce retrieved video data; (c) sample the retrieved video data at a second clock rate to produce sampled video data, wherein the second clock rate is greater than the first clock rate; (d) filter the sampled video data to produce filtered video data, wherein the filtering attenuates high frequency components of the sampled video data; (e) mix, based on a control signal, the retrieved graphics data with the filtered video data to produce mixed data; and buffer the graphics data and retrieving the graphics data from a buffer at the second clock rate to produce the retrieved graphics data.

10. The video graphics processing circuit of claim 9 further comprises, within the memory, programming instructions that, when read by the processing unit, causes the processing unit to convert the mixed signal into an analog signal and provide the analog signal to a monitor.

* * * * *